(12) United States Patent
Konno et al.

(10) Patent No.: US 8,907,896 B2
(45) Date of Patent: *Dec. 9, 2014

(54) STORAGE MEDIUM HAVING INPUT PROCESSING PROGRAM STORED THEREON AND INPUT PROCESSING DEVICE

(71) Applicant: Nintendo Co. Ltd., Kyoto (JP)

(72) Inventors: Hideki Konno, Kyoto (JP); Yoshitaka Ajioka, Kyoto (JP); Yasushi Ebisawa, Kyoto (JP); Kiyoshi Mizuki, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/962,551

(22) Filed: Aug. 8, 2013

(65) Prior Publication Data

US 2014/0043266 A1    Feb. 13, 2014

Related U.S. Application Data

(63) Continuation of application No. 11/232,998, filed on Sep. 23, 2005, now Pat. No. 8,619,025.

(30) Foreign Application Priority Data

Oct. 19, 2004    (JP) ................................ 2004-304961

(51) Int. Cl.
  *G06F 3/033*    (2013.01)
  *G06F 3/041*    (2006.01)
  *G06F 3/0481*    (2013.01)
  *G06F 3/0488*    (2013.01)

(52) U.S. Cl.
  CPC .......... *G06F 3/0416* (2013.01); *G06F 3/04815* (2013.01); *G06F 3/0488* (2013.01); *A63F 2300/1075* (2013.01); *A63F 2300/301* (2013.01)

USPC ............ 345/157; 345/173; 345/419; 345/427

(58) Field of Classification Search
  CPC .................. A63F 2300/1075; A63F 2300/301; G06F 3/04815; G06F 3/0488; G06F 3/0416; G06T 15/00; H04N 13/0275
  USPC .............. 345/156–184, 419, 427; 463/30–34; 715/757, 782, 836, 848–852
  See application file for complete search history.

(56) References Cited

U.S. PATENT DOCUMENTS

| 4,353,552 A | 10/1982 | Pepper, Jr. |
| 5,601,487 A | 2/1997 | Oshima et al. |

(Continued)

FOREIGN PATENT DOCUMENTS

| JP | S63-040967 | 2/1988 |
| JP | S63-280325 | 11/1988 |

(Continued)

OTHER PUBLICATIONS

StarCraft User Manual, Blizzard Entertainment, Irvine, California, 1998, 98 pages.

(Continued)

*Primary Examiner* — Hong Zhou

(57) ABSTRACT

An input processing device including a display screen and a pointing device for inputting corresponding 2-dimensional coordinates on the display screen. A 3-dimensional space is displayed on the display screen and the 2-dimensional coordinates inputted from the pointing device are detected. Next, shift amounts, per unit of time, of the detected 2-dimensional coordinates are calculated based on a predetermined calculation start condition. And the calculated shift amounts are converted to 3-dimensional coordinate shift amounts in the 3-dimensional space.

13 Claims, 11 Drawing Sheets

(56) References Cited

U.S. PATENT DOCUMENTS

| | | |
|---|---|---|
| 5,769,713 A | 6/1998 | Katayama |
| 5,798,761 A | 8/1998 | Isaacs |
| 5,841,440 A | 11/1998 | Guha |
| 5,863,248 A | 1/1999 | Mine et al. |
| 5,898,433 A | 4/1999 | Hijikata |
| 6,120,374 A | 9/2000 | Akada et al. |
| 6,154,197 A | 11/2000 | Watari et al. |
| 6,165,073 A | 12/2000 | Miyamoto et al. |
| 6,191,777 B1 | 2/2001 | Yasuhara et al. |
| 6,196,917 B1 | 3/2001 | Mathias et al. |
| 6,217,446 B1 | 4/2001 | Sanbongi et al. |
| 6,225,978 B1 | 5/2001 | McNeil |
| 6,270,413 B1 | 8/2001 | Aikawa et al. |
| 6,271,854 B1 | 8/2001 | Light |
| 6,354,940 B1 | 3/2002 | Itou et al. |
| 6,371,849 B1 | 4/2002 | Togami |
| 6,494,783 B2 | 12/2002 | Namba et al. |
| 6,524,186 B2 | 2/2003 | Takatsuka et al. |
| 6,542,155 B1 | 4/2003 | Mifune et al. |
| 6,542,168 B2 | 4/2003 | Negishi et al. |
| 6,602,139 B2 | 8/2003 | Yamaguchi |
| 6,654,496 B1 | 11/2003 | Goldberg |
| 6,676,518 B1 | 1/2004 | Sawa et al. |
| 6,762,746 B2 | 7/2004 | Fukuda |
| 6,821,206 B1 | 11/2004 | Ishida et al. |
| 6,842,175 B1 | 1/2005 | Schmalstieg et al. |
| 6,967,644 B1 | 11/2005 | Kobayashi |
| 7,299,424 B2 | 11/2007 | Jarrett et al. |
| 7,366,995 B2 | 4/2008 | Montague |
| 7,371,163 B1 | 5/2008 | Best |
| 2001/0008846 A1 | 7/2001 | Yamauchi et al. |
| 2002/0023265 A1 | 2/2002 | Metcalf |
| 2002/0103031 A1 | 8/2002 | Neveu et al. |
| 2002/0180809 A1 | 12/2002 | Light et al. |
| 2003/0003978 A1 | 1/2003 | Tsuchida |
| 2003/0017863 A1 | 1/2003 | Takahashi et al. |
| 2003/0216177 A1 | 11/2003 | Aonuma et al. |
| 2004/0100479 A1 | 5/2004 | Nakano et al. |
| 2004/0207602 A1 | 10/2004 | Okamura |
| 2008/0170752 A1 | 7/2008 | Murayama |

FOREIGN PATENT DOCUMENTS

| | | |
|---|---|---|
| JP | 05-165565 | 2/1993 |
| JP | 09-245199 | 9/1997 |
| JP | 10-290886 | 11/1998 |
| JP | 10-333834 | 12/1998 |
| JP | 10-340157 | 12/1998 |
| JP | 11-007372 | 1/1999 |
| JP | 11-95650 | 4/1999 |
| JP | 11-353080 | 12/1999 |
| JP | 2000-20749 | 1/2000 |
| JP | 2000-61142 | 2/2000 |
| JP | 2002-163103 | 6/2002 |
| JP | 2003-024639 | 1/2003 |
| JP | 2003-330586 | 11/2003 |
| JP | 2004-70920 | 3/2004 |
| JP | 2004-341924 | 12/2004 |
| JP | 2005-332231 | 12/2005 |
| JP | 2006-122407 | 5/2006 |
| JP | 2006-244353 | 9/2006 |

OTHER PUBLICATIONS

"PikMin Book, the extra number of Famitsu," Enterbrain Inc., pp. 36-37, Nov. 2001.

Explanation of Circumstances Concerning Accelerated Examination, Japanese Patent Application No. 2005-128133, Submitted Aug. 8, 2008.

Explanation of Circumstances Concerning Accelerated Examination, Japanese Patent Application No. 2008-290212.

JPO, "Notice of Reasons for Rejection," Japanese Patent Application No. 2004-304961, dated Dec. 5, 2008.

Gregory M. Nielson et al., "Direct Manipulation Techniques for 3D Objects Using 2D Locator Devices", Proceedings of the 1986 Workshop on Interactive 3D Graphics, S13D '86, Jan. 1, 1987, pp. 175-182, XP55014828, New York, New York, USA.

European Search Report mailed Dec. 22, 2011.

Explanation of Circumstances Concerning Accelerated Examination Submission date: Jul. 1, 2008. Application No. JP 2008-167401.

FIG. 7

| ITEM | a | b | c | d | e | f |
|---|---|---|---|---|---|---|
| BALL | 1.0 | 0 | 0 | 1.0 | 0 | 1.0 |
| FLYING DISC | 1.0 | 0 | 0 | 0.5 | 0 | 2.0 |
| BALLOON | 0.5 | 0 | 0 | 0.5 | 0 | 0.5 |
| BOOMERANG | 1.0 | 0 | 0 | 0.5 | 1.0 | 2.0 |
| ... | ... | ... | ... | ... | ... | ... |

F I G. 9
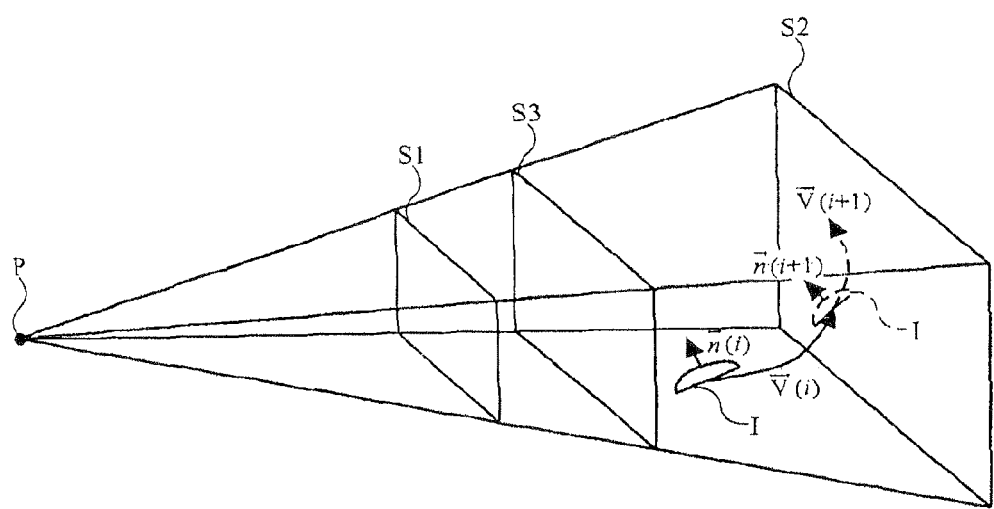

STORAGE MEDIUM HAVING INPUT PROCESSING PROGRAM STORED THEREON AND INPUT PROCESSING DEVICE

CROSS-REFERENCES TO RELATED APPLICATIONS

This application is a continuation of application Ser. No. 11/232,998, filed Sep. 23, 2005, and claims priority to Japanese Patent Application No. 2004-304961, filed Oct. 19, 2004, each of which applications are incorporated in their entirety by reference herein.

BACKGROUND OF THE INVENTION

1. Field of the Invention

The present invention relates to a storage medium having stored thereon an input processing program, and an input processing device. More particularly, the present invention relates to a storage medium having stored thereon an input processing program which is operated by using a device for inputting 2-dimensional coordinates on a display screen to a virtual 3-dimensional space, and an input processing device.

2. Description of the Background Art

As conventional art, techniques operated by using a touch panel for inputting 2-dimensional coordinates on a display screen to a virtual 3-dimensional space displayed on the display screen are disclosed in, for example, Japanese Laid-Open Patent Publication No. 11-7372 and Japanese Laid-Open Patent Publication No. 2004-70920. In any of these techniques, a virtual 3-dimensional space is displayed on a display screen and a touch panel or the like associated with the display screen is provided. And based on a position, on the touch panel, where a user presses down, X and Y coordinates of the 3-dimensional space are determined, and based on the magnitude of a pressure at which the user presses down on the touch panel, a Z coordinate of the 3-dimensional space (a depth direction) is determined.

In the conventional art described above, however, in order to detect the magnitude of a pressing force exerted on the touch panel or the like, it is necessary to additionally provide a function for detecting the pressing force, such as a pressure-sensitive element, which makes the device in itself complicated, resulting in cost increases. And when the user enters a large input in the depth direction of the virtual 3-dimensional space, the user is required to strongly press down on the touch panel, leading to a heavy load exerted on the touch panel. This causes the touch panel to easily break down or a shorter life thereof.

BRIEF SUMMARY OF THE INVENTION

Therefore, in one embodiment the present invention provides a storage medium having stored thereon an input processing program in which based on an input from a device for inputting 2-dimensional coordinates on a display screen, coordinates in a virtual 3-dimensional space are obtained, and an input processing device.

The reference numerals, step Nos. and the like in the parentheses indicate the correspondence with figures illustrated below in order to aid in understanding the present invention and are not to be construed as limiting, in any way, the scope of the present invention.

A first aspect of one embodiment of the present invention is directed to a storage medium having stored thereon a program executed by a computer (21) in an input processing device (1). The input processing device comprises a display screen (12) and a pointing device (13) for inputting corresponding 2-dimensional coordinates on the display screen. The program causes the computer to execute a display control step (S57), a 2-dimensional coordinate detection step (S54), a 2-dimensional coordinate shift amount calculation step (S72), and a 3-dimensional coordinate shift amount conversion step (S73). In the display control step, a virtual 3-dimensional space is displayed on the display screen (FIG. 3, FIG. 4A, and FIG. 4B). In the 2-dimensional coordinate detection step, 2-dimensional coordinates inputted from the pointing device are detected. In the 2-dimensional coordinate shift amount calculation step, shift amounts (vector v), per unit of time, of the 2-dimensional coordinates detected in the 2-dimensional coordinate detection step are calculated according to a predetermined calculation start condition (Yes in S51, No in S52). In the 3-dimensional coordinate shift amount conversion step, the shift amounts calculated in the 2-dimensional coordinate shift amount calculation step are converted to 3-dimensional coordinate shift amounts (vector V) in the virtual 3-dimensional space. The pointing device is an input device for designating 2-dimensional coordinates on the display screen, such as a touch panel, a mouse, a track pad, and a track ball. A coordinate system used for each input device is a touch panel coordinate system or a screen coordinate system.

In a second aspect based on the first aspect, the computer is further operable to execute an input status determination step (S52). In the input status determination step, a status inputted from the pointing device is determined. In the 2-dimensional coordinate shift amount calculation step, based on the calculation start condition that calculation starts when a status where an input from the pointing device is being continuously conducted (Yes in S52) is changed to a status where there is no input (No in S52) is determined in the input status determination step, shift amounts, per unit of time, of the 2-dimensional coordinates detected in the 2-dimensional coordinate detection step immediately before the status of no input are calculated.

In a third aspect based on the second aspect, in the display control step, a predetermined virtual projection plane (S3 in FIG. 5) is set in the virtual 3-dimensional space (S53) and when it is determined in the input status determination step that the input from the pointing device is being continuously conducted, a predetermined object (I) is displayed at a position where the 2-dimensional coordinates detected in the 2-dimensional coordinate detection step are projected on the virtual projection plane (FIG. 3). In the display control step, when a 3-dimensional coordinate shift amount conversion has been conducted in the 3-dimensional coordinate shift amount conversion step, the object is, based on the 3-dimensional coordinate shift amounts, lifted off the virtual projection plane, moved in the virtual 3-dimensional space, and displayed therein (FIG. 4B).

In a fourth aspect based on the third aspect, in the display control step, when it is determined in the input status determination step that an input from the pointing device is being continuously conducted, a display angle (θ) of the object to be projected on the virtual projection plane is controlled based on the 2-dimensional coordinates detected in the 2-dimensional coordinate detection step (S55, FIG. 8).

In a fifth aspect based on the third aspect, the computer is further operable to execute a motion trajectory calculation step (S59). In the motion trajectory calculation step, the 3-dimensional coordinate shift amounts converted in the 3-dimensional coordinate shift amount conversion step are set as an initial motion vector (V) of the object in the virtual 3-dimensional space, and a motion trajectory, per unit of time, in the virtual 3-dimensional space is calculated. In the display control step, based on the motion trajectory calculated in the motion trajectory calculation step, the object is lifted off the virtual projection plane, moved in the virtual 3-dimensional space, and displayed therein.

In a sixth aspect based on the fifth aspect, in the display control step, when it is determined in the input status determination step that an input from the pointing device is being continuously conducted, a display angle of the object to be projected on the virtual projection plane is controlled based on the 2-dimensional coordinates detected in the 2-dimensional coordinate detection step. In the motion trajectory calculation step, an initial normal vector (n) of the object is set according to the display angle, and a motion trajectory, per unit of time, in the virtual 3-dimensional space is calculated based on the motion vector and the normal vector.

In a seventh aspect based on the first aspect, in the 3-dimensional coordinate shift amount conversion step, based on the shift amounts (vx, vy), of a first and a second axes, calculated in the 2-dimensional coordinate shift amount calculation step, a shift amount (Vz) of a third axis perpendicular to the first and the second axes are calculated and a 3-dimensional coordinate shift amount conversion is conducted.

In a eighth aspect based on the seventh aspect, in the 3-dimensional coordinate shift amount conversion step, when the shift amounts of the first and the second axes calculated in the 2-dimensional coordinate shift amount calculation step are vx and vy, respectively, and predetermined constants are a, b, c, d, e, and f, a shift amount Vx of the first axis, a shift amount Vy of the second axis, and a shift amount Vz of the third axis, which are represented as the 3-dimensional coordinate shift amounts, are calculated using:

$$\begin{pmatrix} Vx \\ Vy \\ Vz \end{pmatrix} = \begin{pmatrix} ab \\ cd \\ ef \end{pmatrix} \begin{pmatrix} vx \\ vy \end{pmatrix}.$$

In a ninth aspect based on the eighth aspect, constants a, b, c, d, e, and f respectively vary according to each kind of the objects (FIG. 7).

A tenth aspect is directed to a program which is executed by the computer in the input processing device. The input processing device comprises a display screen and a pointing device for inputting corresponding 2-dimensional coordinates on the display screen, and a virtual 3-dimensional space is displayed on the display screen. The program causes the computer operable to execute a projection plane setting step (S53), a 2-dimensional coordinate detection step (S54), an on-projection-plane moving step (S54), an in-3-dimensional-space moving step (S59), and a display control step (S57). In the projection plane setting step, the virtual projection plane is set in the virtual 3-dimensional space. In the 2-dimensional coordinate detection step, the 2-dimensional coordinates inputted from the pointing device are set. In the on-projection-plane moving step, by projecting on the virtual projection plane the 2-dimensional coordinates detected in the 2-dimensional coordinate detection step, a predetermined object is moved to a position on the virtual projection plane, corresponding to the 2-dimensional coordinates. In the in-3-dimensional-space moving step, the object is moved in the virtual 3-dimensional space outside the virtual projection plane, according to a predetermined input condition. In the display control step, the object which moves in the on-projection-plane moving step and the in-3-dimensional-space moving step is represented in the virtual 3-dimensional space and displayed on the display screen.

An eleventh aspect is directed to an input processing device comprising a display screen, a pointing device, a display control means, a 2-dimensional coordinate detection means, a 2-dimensional coordinate shift amount calculation means, and a 3-dimensional coordinate shift amount conversion means. The pointing device inputs corresponding 2-dimensional coordinates on the display screen. The display control means displays the virtual 3-dimensional space on the display screen. The 2-dimensional coordinate detection means detects 2-dimensional coordinates inputted from the pointing device. The 2-dimensional coordinate shift amount calculation means, according to the predetermined calculation start condition, calculates shift amounts, per unit of time, of the 2-dimensional coordinates detected by the 2-dimensional coordinate detection means. The 3-dimensional coordinate shift amount conversion means converts the shift amounts calculated by the 2-dimensional coordinate shift amount calculation means, to the 3-dimensional coordinate shift amounts in the virtual 3-dimensional space.

In a twelfth aspect based on the eleventh aspect, the pointing device is a touch panel covering the display screen.

A thirteenth aspect is directed to an input processing device comprising a display screen, a pointing device, a projection plane setting means, a 2-dimensional coordinate detection means, an on-projection-plane moving means, an in-3-dimensional-space moving means, and a display control means. The display screen displays a virtual 3-dimensional space. The pointing device inputs corresponding 2-dimensional coordinates on the display screen. The projection plane setting means sets a virtual projection plane in the virtual 3-dimensional space. The 2-dimensional coordinate detection means detects the 2-dimensional coordinates inputted from the pointing device. The on-projection-plane moving means, by projecting on the virtual projection plane the 2-dimensional coordinates detected by the 2-dimensional coordinate detection means, moves a predetermined object to a position on the virtual projection plane, corresponding to the 2-dimensional coordinates. The in-3-dimensional-space moving means, according to a predetermined input condition, moves the object in the virtual 3-dimensional space outside the virtual projection plane. The display control means represents in the virtual 3-dimensional space the object which is moved by the on-projection-plane moving means and the in-3-dimensional-space moving means, and displays the object on the display screen.

In a fourteenth aspect based on the thirteenth aspect, the pointing device is a touch panel covering the display screen.

According to the first aspect, because the shift amounts of the 2-dimensional coordinates are converted to the shift amounts of the 3-dimensional coordinates according to the predetermined calculation start condition, a simple configuration can achieve the conversion of the 2-dimensional coordinates to the 3-dimensional coordinates without providing an extra input device of a pressing force detection function or the like for obtaining 3-dimensional shift amounts. In addition, because of no detection of a pressing force exerted by a user, unlike in the background art, a heavy burden on a pointing device such as a touch panel is eliminated and a reduction in device reliability, which accrues from frequent breakdowns or a shorter life, can be avoided.

According to the second aspect, based on the condition that the status where the input from the pointing device is being continuously conducted is changed to the status where there is no input, the 2-dimensional coordinates detected immediately before the status of no input are converted to the 3-dimensional coordinates. Therefore, a simple operation allows the control by appropriately switching from the input based on the 2-dimensional coordinates to the input based on the 3-dimensional coordinates in the virtual 3-dimensional space.

According to the third aspect, realized is an input processing where according to 2-dimensional coordinates inputted from a pointing device for inputting 2-dimensional coordinates on a display screen, an object moves on a virtual projection plane and when the pointing device comes to input nothing, the object leaves the virtual projection plane and moves in the virtual 3-dimensional space. For example, a game processing can be realized where an item moves on a virtual projection plane set in a 3-dimensional game space while an input from a pointing device is being continuously conducted and the item is thrown from the virtual projection plane to a game space when the pointing device comes to input nothing.

According to the fourth aspect, a display angle of an object can be controlled based on 2-dimensional coordinates inputted from a pointing device.

According to the fifth aspect, because a motion trajectory of an object is shifted based on the converted 3-dimensional coordinate shift amounts, a variety of motion trajectories can be displayed.

According to the sixth aspect, because a motion trajectory of an object is shifted further based on a normal vector obtained from a display angle, of the object, which varies according to 2-dimensional coordinates, a variety of motion trajectories according to positions designated by a pointing device can be displayed.

According to the seventh aspect, because a third axis component perpendicular to 2 axes composing a 2-dimensional coordinate system is calculated based on 2-dimensional coordinate shift amounts, 3-dimensional coordinate shift amounts can be easily obtained from the 2-dimensional shift amounts.

According to the eighth aspect, when 3-dimensional coordinate shift amounts are calculated from 2-dimensional shift amounts, shift amounts of respective axes can be easily obtained using determinants.

According to the ninth aspect, because 3-dimensional shift amounts according to a kind of objects can be obtained, wide variations in motion control of the object in a virtual 3-dimensional space can be attained.

According to the tenth aspect, an input control can be realized under which an object moves on a virtual projection plane according to coordinates inputted from a pointing device for inputting 2-dimensional coordinates on a display screen and the object moves from a virtual projection plane to a virtual 3-dimensional space according to the predetermined input condition.

In addition, the input control device enables the same effect as that of the aforementioned storage medium having stored thereon the input control program.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows an example of setting of constants a to f used for a coordinate conversion;

FIG. 9 is a conceptual diagram of a motion vector and a normal vector which are set when the item I leaves the virtual projection plane and moves in the virtual game space;

DETAILED DESCRIPTION OF THE INVENTION

Figure 1:
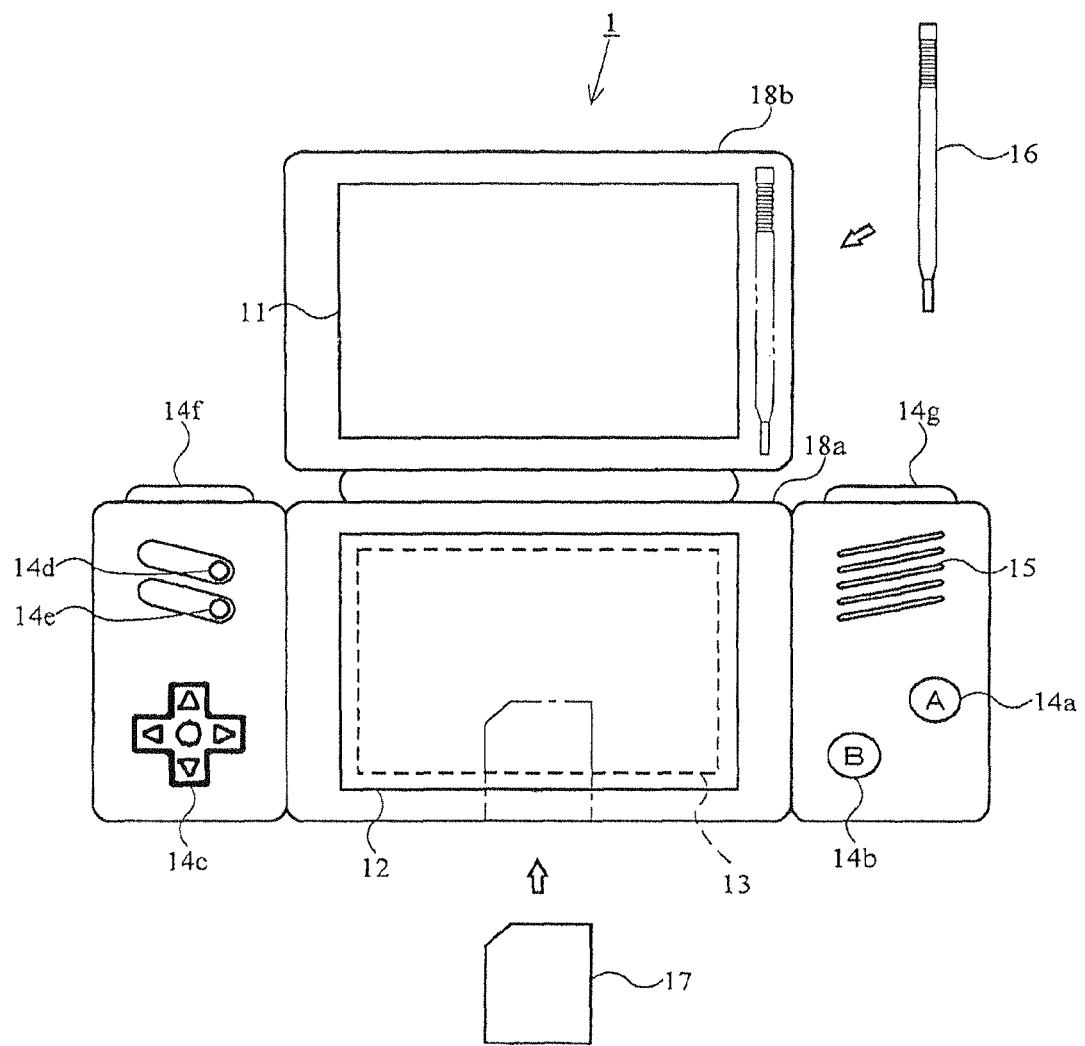
FIG. 1 is an outline view illustrating a game apparatus 1 executing a game program according to one embodiment of the present invention.

A game apparatus which executes a game program will be described with reference to the figures. FIG. 1 is an outline view showing an outer appearance of the game apparatus 1 which executes a game program. As an example of the game apparatus 1, a hand-held type game apparatus is illustrated herein. And a game program used in the following explanation is an example of an input processing program of the present invention and a game apparatus 1 used in the following explanation is an example of an input processing apparatus of the present invention.

In FIG. 1, the game apparatus 1 of the present embodiment is accommodated in a housing 18 so that two liquid crystal display devices (hereinafter referred to as "LCDs") 11 and 12 are placed in predetermined positions. Specifically, in the case where the first LCD 11 and the second LCD 12 are to be disposed one on top of the other, the housing 18 is composed of a lower housing 18 *a* and an upper housing 18 *b*, the upper housing 18 *b* being supported by a portion of the upper side of the lower housing 18 *a* so as to be pivotable. The upper housing 18 *b* has a planar contour which is slightly larger than that of the first LCD 11. The upper housing 18 *b* has an opening in one principal face thereof, through which a display screen of the first LCD 11 is exposed. The lower housing 18 *a* has a more elongated planar contour than that of the upper housing 18 *b* (i.e., so as to have a longer lateral dimension). An opening for exposing the display screen of the second LCD 12 is formed in a portion of the lower housing 18 *a* which lies substantially in the center of the lower housing 18 *a* along the lateral direction. A sound hole for the loudspeaker 15 is formed in either (right or left) wing of the lower housing 18 *a* between which the second LCD 12 is interposed. An operation switch section 14 is provided on the right and left wings of the lower housing 18 *a* between which the second LCD 12 is interposed.

The operation switch section 14 includes: an operation switch ("A" button) 14 *a* and an operation switch ("B" button) 14 *b*, which are provided on a principal face of the right wing of the lower housing 18 *a* (lying to the right of the second LCD 12); and a direction switch (cross key) 14 *c*, a start switch 14 *d*, a select switch 14 *e*, and side switches 14 *f* and 14 *g*, which are provided on a principal face of the left wing of the lower housing 18 *a* (lying to the left of the second LCD 12). The operation switches 14 *a* and 14 *b* are used for giving instructions such as: "pass", "shoot", etc., in the case of a sports game such as a soccer game; "jump", "punch", "use a weapon", etc., in the case of an action game; or "get an item", "select a weapon", "select a command", etc., in the case of a role playing game (RPG) or a simulation RPG. The direction switch 14 *c* is used by a player for providing instructions concerning directions on the game screen, e.g., instructions of a moving direction for (i.e., a direction in which to move) a player object (or a player character) that can be controlled by using the operation switch section 14, or instructions of a moving direction for a cursor, for example. The side switches ("L" button) 14 *f* and ("R" button) 14 *g* are provided at the left and right ends of an upper face (upper side face) of the lower housing 18 *a*. As necessary, more operation switches may be added.

A touch panel 13 (an area marked by dotted lines in FIG. 1) is mounted on the upper principal face of the second LCD 12. The touch panel 13 may be of any one of a resistive film type, an optical type (infrared type), or a capacitive coupling type. When a stylus 16 (or a finger) is pressed against or moved or dragged on the upper principal face of the touch panel 13, the touch panel 13 detects the coordinate position of the stylus 16 and outputs coordinate data.

As necessary, a hole (an area marked by double-dot lines in FIG. 1) for accommodating the stylus 16 with which to manipulate the touch panel 13 is provided near a side face of the upper housing 18 *b*. The hole can hold the stylus 16. In a portion of a side face of the lower housing 18 *a* is provided a cartridge receptacle (an area marked by dash-dot lines in FIG. 1), in which a game cartridge 17 (hereinafter simply referred to as "the cartridge 17") internalizing a memory having a game program stored therein (e.g., a ROM) is detachably inserted. The cartridge 17 is an information storage medium for storing a game program, e.g., a non-volatile semiconductor memory such as a ROM or a flash memory. A connector (see FIG. 2) lies inside the cartridge receptacle for providing electrical connection with the cartridge 17. Furthermore, the lower housing 18 *a* (or alternatively the upper housing 18 *b*) accommodates an electronic circuit board on which various electronic components such as a CPU are mounted. Examples of the information storage medium for storing a game program are not limited to the aforementioned non-volatile semiconductor memory, but may also be a CD-ROM, a DVD, or any other optical disk type storage medium.

Figure 2:
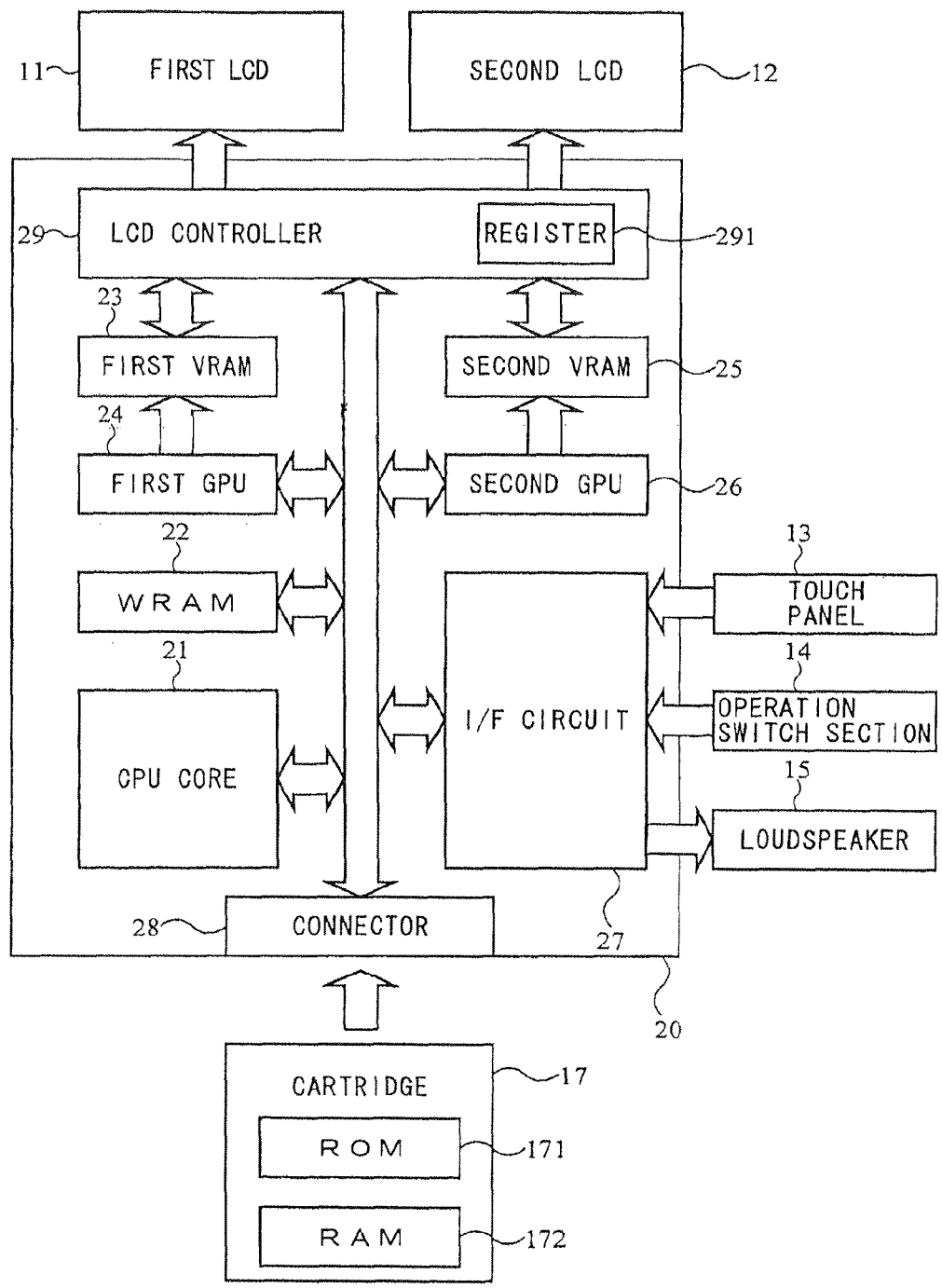
FIG. 2 is a block diagram illustrating the game apparatus 1 shown in FIG. 1.

FIG. 2 is a block diagram illustrating an internal structure of the game apparatus 1 of FIG. 1. In FIG. 2, a CPU core 21 is mounted on the electronic circuit board 20 accommodated in the housing 18. Via a given bus, the CPU core 21 is connected to a connector 28, an input/output interface (I/F) circuit 27, a first graphics processing unit (first GPU) 24, a second graphics processing unit (second GPU) 26, a WRAM 22, and an LCD controller 29. The cartridge 17 is detachably connected to the connector 28. The cartridge 17 is a storage medium for storing a game program, and specifically, the cartridge 17 includes a ROM 171 for storing a game program and a RAM 172 for storing backup data in a rewritable manner. A game program which is stored in the ROM 171 of the cartridge 17 is loaded to a WRAM 22, and the game program having been loaded to the WRAM 22 is executed by the CPU core 21. Temporary data which is obtained by the CPU core 21 executing the game program and data from which to generate images are stored in the WRAM 22. The I/F circuit 27 is connected to the operation switch section 14, the touch panel 13, and the loudspeaker 15.

The first GPU 24 is connected to a first video-RAM (a first VRAM) 23. The second GPU 26 is connected to a second video-RAM (a second VRAM) 25. In accordance with an instruction from the CPU core 21, the first GPU 24 generates a first game image on the basis of the data used for image generation which is stored in the WRAM 22, and writes (stores) images in the first VRAM 23. In accordance with an instruction from the CPU core 21, the second GPU 26 generates a second game image on the basis of the data used for image generation which is stored in the WRAM 22, and writes (stores) images in the second VRAM 25. The first VRAM 23 and the second VRAM 25 are connected to an LCD controller 29.

The LCD controller 29 includes a register 291. The register 291 stores a value of 0 or 1 in accordance with an instruction from the CPU core 21. If a value of the register 291 is 0, the LCD controller 29 outputs a game image written in the first VRAM 23 to the first LCD 11 and a game image written in the second VRAM 25 to the second LCD 12. And if a value of the register 291 is 1, the LCD controller 29 outputs a game image written in the first VRAM 23 to the second LCD 12 and a game image written in the second VRAM 25 to the first LCD 11.

The I/F circuit 27 is a circuit which controls exchanges of data between the CPU core 21 and the external input/output devices such as, the operation switch section 14, the touch panel 13, and the loudspeaker 15. The touch panel 13 (including a device driver for the touch panel) has a coordinate system corresponding to the coordinate system of the second VRAM 25, and outputs data of position coordinates corresponding to a position which is input (designated) by means of the stylus 16. The display screen of the second LCD 12 has a resolution of 256 dots×192 dots, and the touch panel 13 also has a detection accuracy of 256 dots×192 dots so as to correspond to the display screen. The detection accuracy of the touch panel 13 may be lower or higher than the resolution of the display screen of the second LCD 12.

Figure 3:
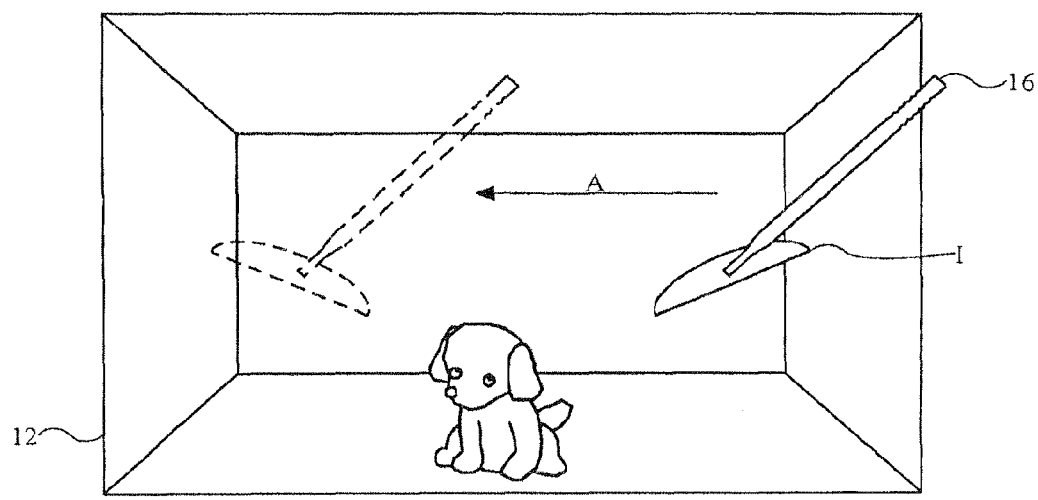
FIG. 3 shows an example of a display screen image on the second LCD 12, illustrating a view of determining an initial position of an item Ito be thrown in a game space.
Figure 4A:
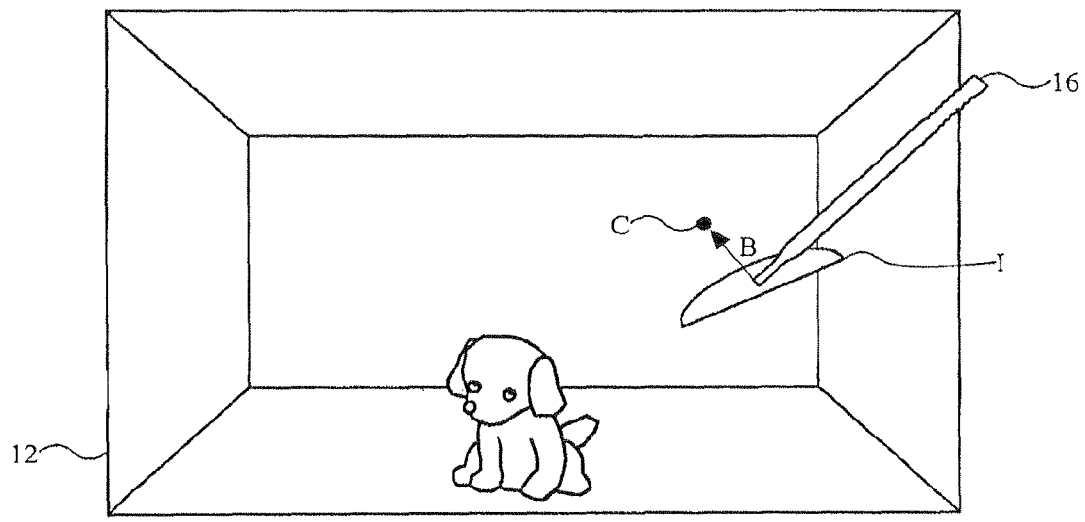
FIG. 4A and FIG. 4B show examples of display screen images on the second LCD 12, illustrating views of operations of throwing the item I in the game space and of moving the thrown item I in the game space.
Figure 4B:
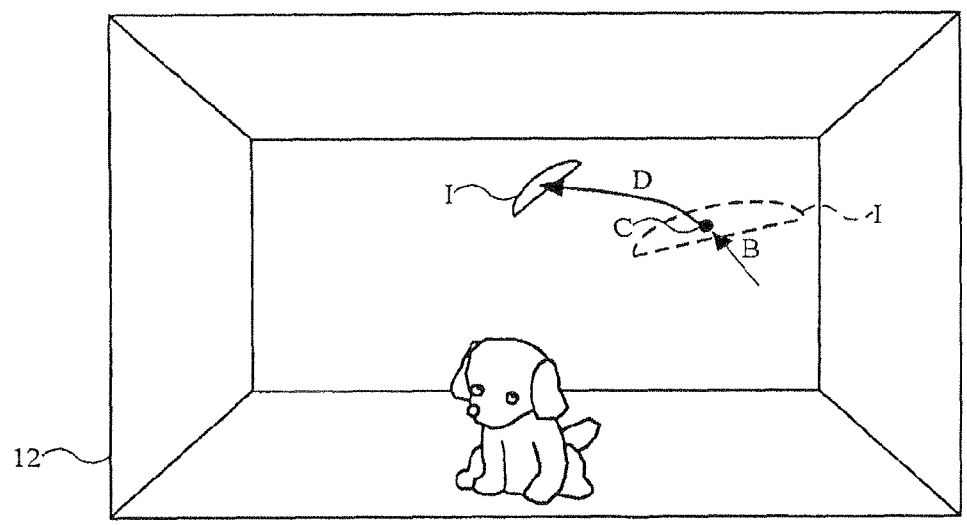

Hereinafter, referring to FIG. 3, FIG. 4A, and FIG. 4B, a flow of game processing of the game program executed by the game apparatus 1 will be described with reference to examples of specific display screen images. While in an embodiment of the present invention, a game, in which items are thrown in a game space, executed by the game apparatus 1, will be described, the description for this kind of the game is not to be construed as limiting the present invention. FIG. 3 shows an example of a display screen image of the second LCD 12 illustrating how an initial position of an item I to be thrown in a game space is determined. FIG. 4A shows an example of a display screen image on the second LCD 12, illustrating an operation of throwing the item I in the game space. FIG. 4B shows an example of a display screen image on the second LCD 12, illustrating an operation of moving the thrown item I in the game space.

In FIG. 3, a view of a virtual 3-dimensional space is displayed on the second LCD 12, and the item I (a flying disc is shown in FIG. 3) which is thrown in the game space is displayed. As is made clear by the below description, the game space corresponding to a silhouette volume based on a given camera view point is displayed on the second LCD 12 and the item I is projected on a virtual projection plane which is set within the silhouette volume. A player can move the item I in the game space by touch-operating a position of the item I displayed on the second LCD 12 by means of the touch panel 13. Specifically, when the player conducts a touch-operation dragging the item I displayed on the second LCD 12 by means of the touch panel 13 (touching a position of the touch panel 13 superimposed on the item I on the second LCD 12, keeping as it is, and then moving the touch-operating position), the item I moves to a position, of the virtual projection plane, which corresponds to coordinates inputted from the touch panel 13. For example, FIG. 3 shows an example in which the player moves the item I in A direction as illustrated. In other words, the player can move the item I on the virtual projection plane through the touch-operation of dragging the item.

When the player finishes the touch-operation on the touch panel 13 after the touch-operation dragging the item I (that is, when the player lifts off the touch panel the stylus 16 or the like being used for the touch-operation), the item I is thrown in the game space from the virtual projection plane. Suppose that as shown in FIG. 4A, the player conducts a touch-operation dragging the item I in direction B and finishes the touch-operation at a point C by lifting the stylus 16 or the like off the touch-panel 13. In this case, based on 2-dimensional coordinate information inputted from the touch panel 13 immediately before finishing the touch-operation, the item I is thrown in the game space from the virtual projection plane. As shown in FIG. 4B, based on 2-dimensional coordinate information (vector B) inputted from the touch panel 13 immediately before finishing the touch-operation at the point C, 3-dimensional coordinate information (motion vector D) which is set in a virtual 3-dimensional game space is calculated, and based on the motion vector D, the item I leaves the virtual projection plane and moves in the game space.

Figure 5:
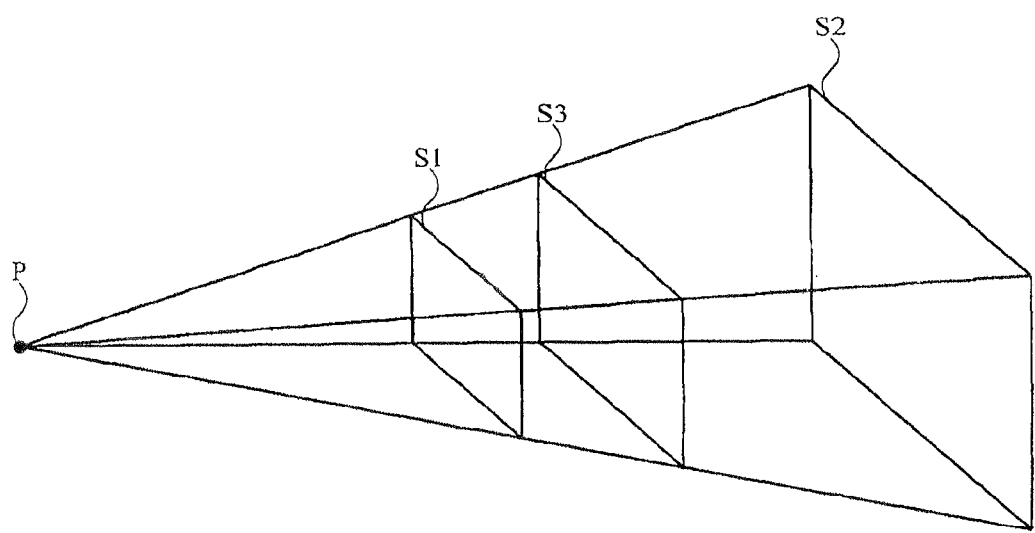
FIG. 5 is a conceptual diagram illustrating a virtual 3-dimensional game space and a virtual projection plane.

Next, referring to FIG. 5, a virtual 3-dimensional game space and a virtual projection plane displayed on the second LCD 12 will be described. FIG. 5 is a conceptual diagram illustrating the virtual 3-dimensional game space and the virtual projection plane.

In FIG. 5, a front clip plane 51 and a rear clip plane S2 with reference to a camera view point P are set. A space set in a silhouette volume sandwiched between the front clip plane 51 and the rear clip plane S2 is displayed on the second LCD 12. A virtual projection plane S3 is set within the silhouette volume and placed, for example, in parallel with the front clip plane S1. A coordinate system of the touch panel 13 is set on the front clip plane S1 and coordinates inputted from the touch panel 13 are projected on the virtual projection plane S3. Although in order to facilitate the understanding of the present invention, the front clip plane S1 on which the touch panel coordinate system is set and the virtual projection plane S3 are arranged in parallel with each other, needless to say, projection of the input coordinates can be conducted in the same manner even if the front clip plane S1 and the virtual projection plane S3 are not in parallel with each other. Also needless to say, the projection of the input coordinates can be conducted in the same manner even if the virtual projection plane S3 is of a sphere or the like, not a plane.

Figure 6A:
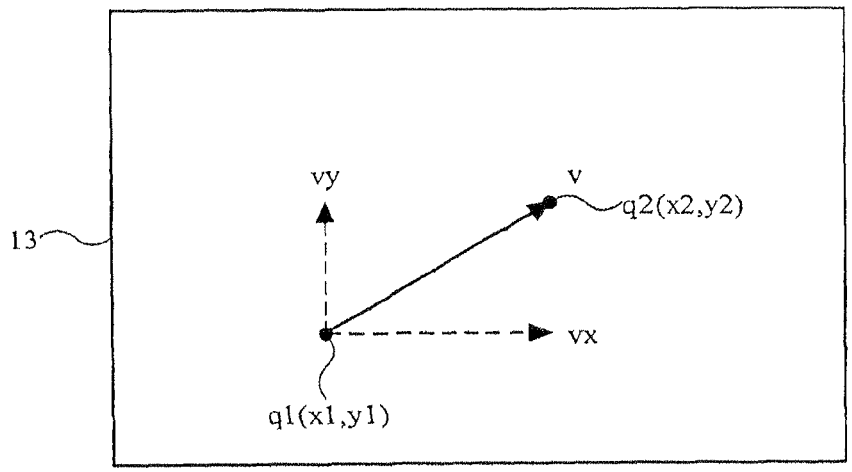
FIG. 6A and FIG. 6B are conceptual diagrams illustrating a vector v (vx, vy) and a vector V (Vx, Vy, Vz)
Figure 6B:
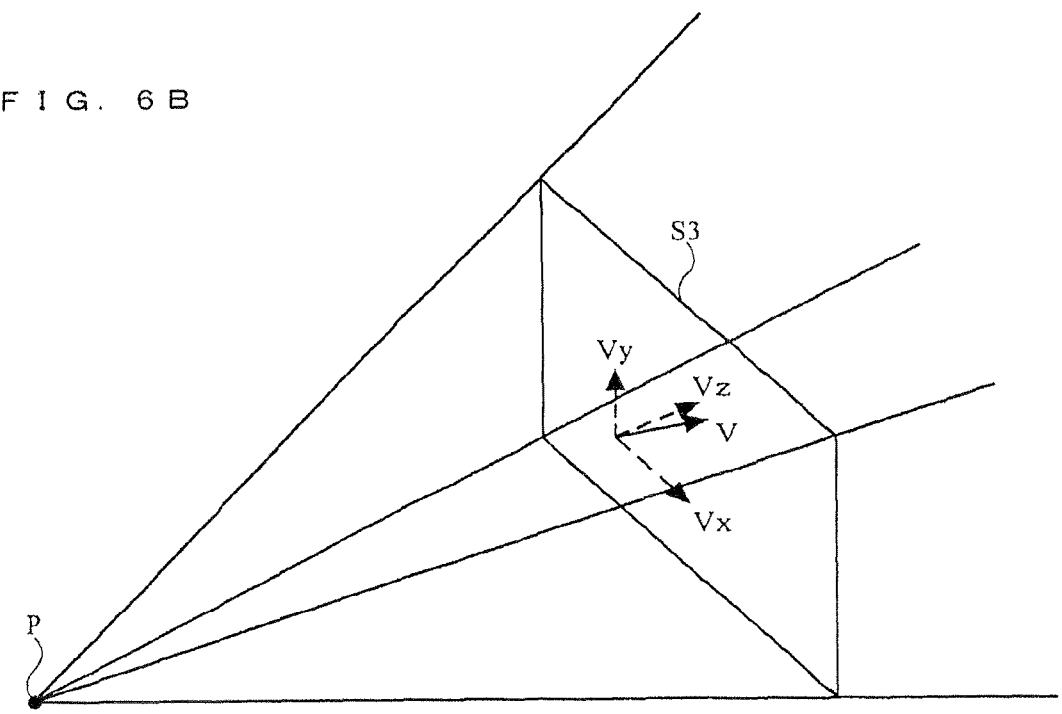

Next, referring to FIG. 6A, FIG. 6B, and FIG. 7, a coordinate conversion from the touch panel coordinate system displayed in 2-dimensional coordinates to a game space coordinate system displayed in a 3-dimensional coordinate system will be described. FIG. 6A is a conceptual diagram illustrating a vector v (vx, vy) to be set in the touch panel coordinate system which is set on the touch panel 13. FIG. 6B is a conceptual diagram illustrating a vector V (Vx, Vy, Vz) to be set in 3-dimensional coordinates which is set in the virtual 3-dimensional game space. FIG. 7 shows an example of setting of constants a to f used for the coordinate conversion.

In FIG. 6A, if the touch panel 13 is touch-operated from a point q1 (x1, y1) to a point q2 (x2, y2) in the touch panel coordinate system, a vector v (vx, vy) spanning from the point q1 to the point q2 is obtained as follows.

$$vx = x2 - x1$$

$$vy = y2 - y1$$

In the present embodiment, when the player conducts an operation on the touch panel 13, corresponding to a predetermined condition, the aforementioned 2-dimensional vector v (vx, vy) set immediately before the operation is conducted is coordinate-converted, and a 3-dimensional vector V (Vx, Vy, Vz) as shown in FIG. 6B is calculated. Here, the coordinate conversion from the 2-dimensional vector v (vx, vy) to the 3-dimensional vector V (Vx, Vy, Vz) is conducted as follows.

$$\begin{pmatrix} Vx \\ Vy \\ Vz \end{pmatrix} = \begin{pmatrix} ab \\ cd \\ ef \end{pmatrix} \begin{pmatrix} vx \\ vy \end{pmatrix}.$$

Constants a to f used in the above formula are set for each item thrown in the game space as shown in FIG. 7. For example, if an item I is a flying disc, constants are set as follows: a=1.0, b=0, c=0, d=0.5, e=0, and f=2.0, and a vector V (Vx, Vy, Vz) is calculated by using Vx=vx, Vy=0.5vy, Vz=2vy. As described above, in the coordinate conversion of the present embodiment, values of respective 3 axes of motion amounts (vector V) which are set in a 3-dimensional coordinate system are calculated by using the values of the respective 2 axes, represented as motion amounts (vector v) between two points, which are set in a 2-dimensional coordinate system. And because the constants used for the coordinate conversion vary depending on each item thrown in the game space, characteristics of each item can be represented through the coordinate conversion.

Figure 8:
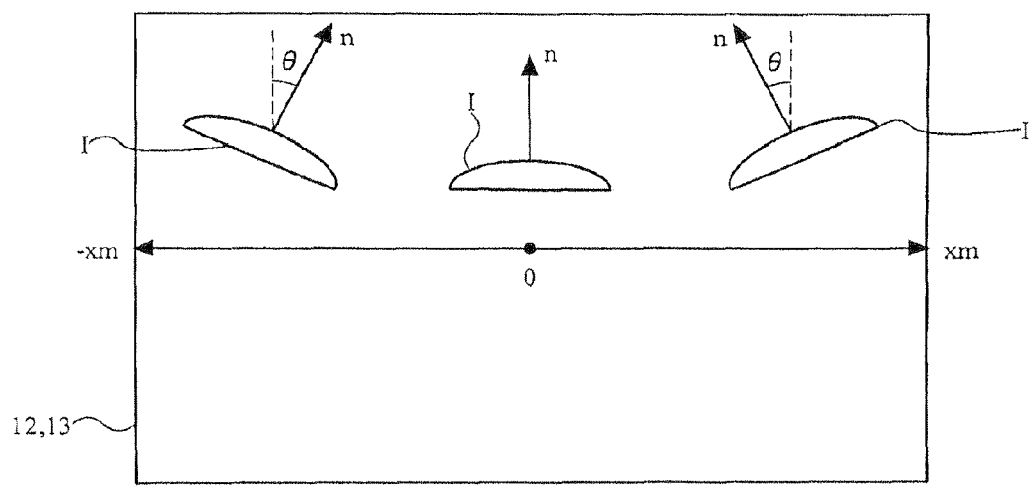
FIG. 8 shows an example of a screen display image of the item I according to a tilt angle which is initially set on the item I.

Next, referring to FIG. 8 and FIG. 9, calculation of a motion trajectory when an item I leaves a virtual projection plane and moves in a virtual game space will be described. FIG. 8 shows an example of a screen display image of the item I according to a tilt angle which is initially set on the item I. FIG. 9 is a conceptual diagram illustrating a motion vector and a normal vector which are set when the item I leaves the virtual projection plane and moves in the virtual game space.

In FIG. 8, when a user conducts a touch-operation dragging the item I displayed on the second LCD 12 by using the touch panel 13, as described above, the item I moves to a position on the virtual projection plane according to coordinates inputted from the touch panel 13. And a tilt angle θ which is initially set on the item I is set based on a position in an xm direction on the touch panel (lateral direction in FIG. 8), as shown in the figure. Specifically, let a center of the touch panel, a right direction and a left direction be xm=0, +xm, and −xm, respectively. And the tilt angle θ is obtained as follows.

$$\theta = j \times m + k \text{ ($j$ and $k$ are constants)}$$

A tilt angle in an upward direction in FIG. 8, which is a vertical direction on the touch panel 13, is θ=0°. And on the second LCD 12, the item I is displayed by adjusting the tilt angle θ of the normal thereof. In other words, the item I is displayed by tilting the item I based on a tilt angle corresponding to a position in the horizontal direction on the touch panel. And based on the initially set tilt angle θ of the item I, a normal vector n=(sin θ, cos θ, 0) is initially set.

As described above, after an operation where the item I leaves the virtual projection plane and is thrown in the 3-dimensional game space, the item I moves in the game space based on the motion vector and the normal vector. In FIG. 9, a motion vector and a normal vector which are set on each item I are calculated for each frame in which game processing is conducted. Specifically, a normal vector n (i+1) in a new frame (i+1) is calculated using a normal vector n (i) set in a frame (i) immediately preceding, a motion vector V (i), and a constant a as follows, $$\vec{n}(i+1) = \frac{\vec{n}(i) + \alpha \vec{V_{xz}}(i)}{|\vec{n}(i) + \alpha \vec{V_{xz}}(i)|}$$

where $$\vec{V_{xz}}$$

is a motion vector on an XZ plane when Y is 0. And a motion vector V (i+1) in a new frame (i+1) is calculated using a normal vector n (i) set in a frame (i) immediately preceding, a motion vector V (i), a gravity vector g, and a constant β as follows, $$\vec{V}(i+1) = \vec{V}(i) + ' |\vec{V}(i)| \vec{n_{xz}}(i) + g$$

where $$\vec{V_{xz}}$$

is a normal vector on an XZ plane when Y is 0.

Figure 10:
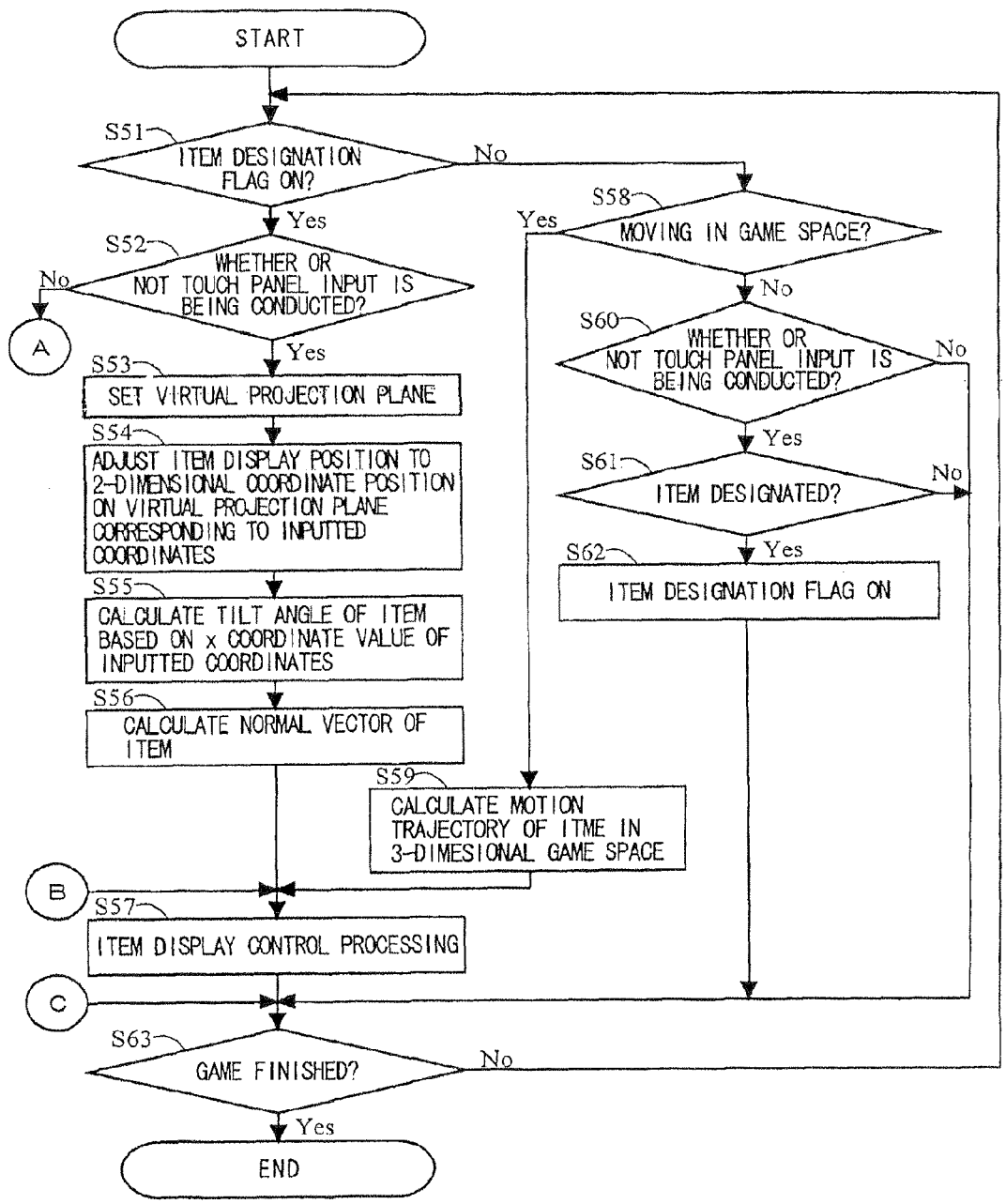
FIG. 10 is a flow chart illustrating an operation conducted by the game apparatus 1 by executing the game program according to the present invention.
Figure 11:
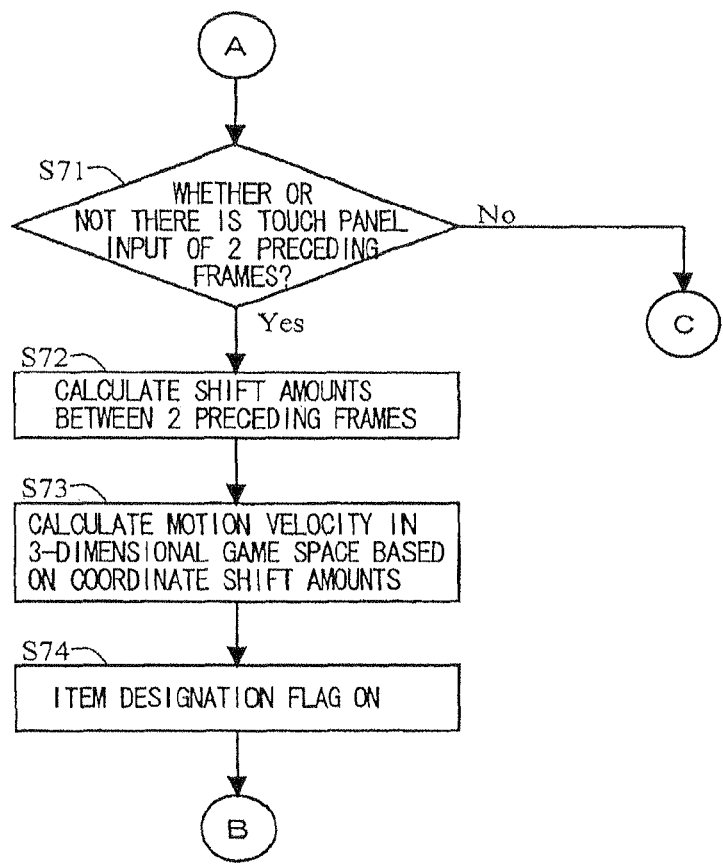
FIG. 11 is a flow chart illustrating an operation conducted by the game apparatus 1 by executing the game program according to the present invention.

Next, referring to FIG. 10 and FIG. 11, processes, based on information inputted from the touch panel 13, which are executed by the game apparatus 1 according to a game program will be described. FIG. 10 and FIG. 11 are flow charts illustrating operations which are conducted by the game apparatus 1 by executing the game program. The programs for executing these processes are contained in the game program which is stored in the ROM 171 and are loaded from the ROM 171 to the WRAM 22 when power of the game apparatus 1 is turned on, so as to be executed by the CPU core 21.

When the power source (not shown) of the game apparatus 1 is turned on, the CPU core 21 executes a boot program (not shown), and thereby the game program stored in the cartridge 17 is loaded to the WRAM 22. The game program having been loaded is executed by the CPU core 21, thereby to execute steps (abbreviated as "S" in FIGS. 10 and 11) shown in FIG. 10 and FIG. 11. The game program is executed, and thereby game images and the like in accordance with the game program are written on the first LCD 11 and the second LCD 12. The detailed description of the contents of the game is not given. Here, the processes in which the item moves according to the information inputted from the touch panel 13 will be described in detail.

In FIG. 10, the CPU core 21 starts the game processing, and after each kind of initialization, starts the game. The CPU core 21 determines whether or not an item designation flag is on (step 51). The CPU core 21 proceeds to the next step 52 when the item designation flag is on, and proceeds to the next step 58 when the item designation flag is off. Here, the item designation flag is a flag to determine whether or not a player is touching an item I (see FIG. 3) by means of the touch panel 13, and is set so as to be turned on when the player is touching an item I.

In step 52, the CPU core 21 determines whether or not there is an input from the touch panel 13. And the CPU core 21 proceeds to the next step 53 when there is an input from the touch panel 13, and proceeds to the next step 71 when there is no input from the touch panel 13.

In step 53, the CPU core 21 sets a virtual projection plane S3 (see FIG. 9) in a virtual 3-dimensional game space, and proceeds to the next step. Since the virtual projection plane S3 is as described above, the detailed description is not given here.

Next, the CPU core 21 detects coordinates inputted from the touch panel 13 and adjusts a display position of the item I to a 2-dimensional coordinate position on the virtual projection plane S3 corresponding to the detected coordinates (step 54; FIG. 3). The CPU core 21 calculates a tilt angle θ of the item I, based on an x coordinate value (a lateral coordinate on the touch panel 13; an xm direction shown in FIG. 8) of the inputted coordinates (step 55; FIG. 8). The CPU core 21 calculates a normal vector n in initial setting of the item I, based on the tilt angle θ calculated in the above step 55 (step 56). Here, the CPU core 21 calculates the normal vector n of the item I using n=(sin θ, cos θ, 0). The CPU core 21 tilts the item I according to the tilt angle θ calculated in step 55, conducts processes of item display control (step 57; FIG. 8.) for the second LCD 12, and when the game is continued (No in step 63), returns to the above step 51 to repeat the processes. The CPU core 21 repeats these steps 51 to 57, and thereby the item I moves on the virtual projection plane S3 according to the touch-operation on the touch panel 13 conducted by the player.

On the other hand, referring to FIG. 11, processes in which the item designation flag is on (Yes in step 51) and there is no input from the touch panel 13 (No. in step 52) will be described. When it is determined in step 52 that there is no input from the touch panel 13, the CPU core 21 determines whether or not there is an input from the touch panel 13 in 2 frames immediately preceding (step 71). When there is an input from the touch panel 13 in the 2 frames immediately preceding, the CPU core 21 proceeds to the next step 72. When there is no input from the touch panel 13 in either one of the 2 frames immediately preceding, the CPU core 21 proceeds to the next step 63.

In step 72, the CPU core 21 calculates coordinate shift amounts between the 2 frames immediately preceding, using respective coordinates inputted from the touch panel 13. Specifically, when the input coordinates of the 2 frames immediately preceding are a point q1 (x1, y1) and a point q2 (x2, y2), a vector v spanning from the point q1 to the point q2 (vx, vy) is calculated as the coordinate shift amounts as follows.

$$vx=x2-x1$$

$$vy=y2-y1$$

And the CPU core 21 proceeds to the next step.

Next, the CPU core 21 calculates a motion velocity (motion vector V) of the item I in the virtual 3-dimensional game space (step 73) based on the coordinate shift amounts (vector v) obtained in the above step 72, and proceeds to the next step. In step 73, conducted is a coordinate conversion where values of respective 3 axes of the motion amounts (vector V) which are set in the 3-dimensional coordinate system are calculated by using values of respective 2 axes represented as the motion amounts (vector v) between 2 points which are set in the aforementioned 2-dimensional coordinate system. Here, constants a to f are set according to a kind of the items I as described above.

Next, the CPU core 21 turns off the item designation flag (step 74) and proceeds to step 57. The CPU core 21 executes these steps 71 to 74 and thereby the motion amounts between the 2 points, which are set in the 2-dimensional coordinate system, are coordinate-converted to the motion amounts (vector V) which are set in the 3-dimensional coordinate system.

Referring back to FIG. 10, processes in which the item designation flag is off (No in step 51) will be described. When it is determined in step 51 that the item designation flag is off, the CPU core 21 determines whether or not the item I has left the virtual projection plane and is moving in the 3-dimensional game space (step 58). Here, the CPU core 21 determines whether the item I is moving in the 3-dimensional game space, for example when a motion vector V is set on the item I. And when the item I is moving in the game space, the CPU core 21 proceeds to the next step 59. When the item I is not moving in the game space (for example, when the player first touches the touch panel 13 or when the player is not touching the touch panel 13 at all), the CPU core 21 proceeds to the next step 60.

In step 59, the CPU core 21 calculates a motion trajectory of the item I in the 3-dimensional game space. For the calculation of the motion trajectory of the item I, the CPU core 21 calculates a normal vector n and a motion vector V of a new frame, using the normal vector n and the motion vector V calculated in the frames immediately preceding, as described above (see FIG. 9). And the CPU core 21 moves the item I according to the normal vector n and the motion vector V calculated in step 59, conducts processes of item display control on the second LCD (step 57; FIG. 4B), and when the game is continued (No in step 63), returns to the above step 51 and repeats the processes. The CPU core 21 repeats these steps 51, 58, 59 and 57, and thereby the item I which leaves the virtual projection plane and moves in the virtual game space is represented.

In step 60, the CPU core 21 determines whether or not there is an input from the touch panel 13. The CPU core 12 proceeds to the next step 61 when there is an input from the touch panel 13, and proceeds to the next step 63 when there is no input from the touch panel 13.

In step 61, the CPU core 21 determines whether or not the player is touch-operating a portion of the touch panel 13 where the item I is superimposed on the second LCD 12. When the player is touch-operating the item I, the CPU core 21 turns on the item designation flag (step 62) and proceeds to step 63. When the player is not touch-operating the item I, the CPU core 21 proceeds directly to step 63.

In step 63, the CPU core determines whether or not the game is continued. The CPU core returns to the above step 51 and repeats the processes when the game is continued, and ends the processing of this subroutine when the game is finished. The processing of the above steps 51 to 63 is repeated per unit of time (for example, one frame) for game processing.

Although in the above description, the motion vector V for the virtual 3-dimensional game space is calculated based on the condition that the player lifts the stylus 16 or the like off the touch panel 13 (No in step 52), the calculation may be conducted based on other conditions. For example, the calculation of the motion vector V may be conducted based on a condition that a player presses down the operation switch section 14 (for example, the operation switch (A button) 14a).

Although in the above description, the virtual projection plane S3 is described as a plane which is placed in parallel with the front clip plane S1, the virtual projection plane S3 and the front clip plane S1 may be in non-parallel with each other. Even if the virtual projection plane S3 is inclined toward the front clip plane S1, 2-dimensional coordinates (X axis, Y axis) on the virtual projection S3 can be set by similarly conducting the projection of input coordinates. In this case, with a direction perpendicular to the virtual projection plane S3 as the third axis (Z axis), the motion vector V in the virtual 3-dimensional game space can similarly be calculated using the aforementioned coordinate conversion. Thus, according to the game apparatus disclosed herein, realized is a game in which an item moves according to coordinates inputted from a touch panel for inputting 2-dimensional coordinates on a display screen, and the item is thrown in a virtual 3-dimensional game space from a virtual projection plane based on a predetermined condition (an operation of lifting off the touch panel). In addition, because components perpendicular to the virtual projection plane are calculated based on shift amounts (vector v) of the 2-dimensional coordinates which are set on the virtual projection plane, shift amounts (vector V) of the 3-dimensional coordinates can easily be obtained from the shift amounts of the 2-dimensional coordinates. Therefore, a simple configuration can achieve a conversion from 2-dimensional coordinates to 3-dimensional coordinates without providing a pressing force detection function, unlike in the conventional art. And because of no pressing force detection, a heavy burden on an input means such as a touch panel or the like is eliminated and a reduction in device reliability, which accrues from frequent breakdowns or a shorter life, can be avoided. Although in the above embodiment, the touch panel is used as an input device for inputting 2-dimensional coordinates on a display screen, other pointing devices may be used. Here, a pointing device is an input device for designating input positions and coordinates on a display screen, and when a mouse, a track pad, or a track ball, for example, is used as an input device and information of a screen coordinate system calculated from values outputted from the input device is used, the present invention can similarly be realized. In the case where a pointing device such as a mouse or the like is used, processing for calculating coordinates from values outputted from a mouse or the like may be conducted on a game apparatus or the like, with a touch status and a non-touch status corresponding to on and off of a click button.

Needless to say, although in the present embodiment, the touch panel 13 is mounted on the game apparatus 1 in an integrated manner, even a configuration where a game apparatus and a touch panel are placed in a separated manner can realize the present invention. And although in the above embodiment, two display devices are provided, one display device may be applicable. In other words, in the above embodiment, only the second LCD 12 may be mounted without providing the first LCD 11. And in the above embodiment, the touch panel 13 may be attached on the upper surface of the first LCD 11 without providing the second LCD 12.

In addition, although in the above embodiment, the touch panel 13 is mounted on the game apparatus 1 in an integrated manner, an information processing device such as a general personal computer or the like where a touch panel is used as an input device may also be applicable. In this case, a program which the computer of the information processing device executes is not limited to a game program typically used for a game, and is a general-purpose input processing program where 2-dimensional coordinate values obtained by the aforementioned method are used in operation processing for the above information processing device.

A storage medium having an input processing program stored thereon and an input processing device enable, with a simple configuration, a conversion from 2-dimensional coordinates to 3-dimensional coordinates, and are applicable to games and input processing or the like where a pointing device for inputting 2-dimensional coordinates on a display screen is used.

While the invention has been described in detail, the foregoing description is in all aspects illustrative and not restrictive. It is understood that numerous other modifications and variations can be devised without departing from the scope of the invention.

We claim:

1. A non-transitory computer-readable storage medium having stored thereon an input processing program to be executed by a computer in an input processing device including a display screen and a pointing device for inputting corresponding 2-dimensional coordinates on the display screen, wherein the computer is operable to execute:
a display control step for displaying a virtual 3-dimensional space on the display screen;
a 2-dimensional coordinate detection step for detecting the 2-dimensional coordinates inputted from the pointing device;
a 2-dimensional coordinate shift amount calculation step for calculating a first shift amount, per unit of time, in a first axis direction, of the 2-dimensional coordinates detected in the 2-dimensional coordinate detection step, and a second shift amount of the 2-dimensional coordinates, per unit of time, in a second axis direction; and
a 3-dimensional coordinate shift amount conversion step for calculating a shift amount of a first axis in 3-dimensional coordinates in the virtual 3-dimensional space by using at least one of the first shift amount and the second shift amount, calculating a shift amount of a second axis in the 3-dimensional coordinates by using at least one of the first shift amount and the second shift amount, and calculating a shift amount of a third axis in the 3-dimensional coordinates by using at least one of the first shift amount and the second shift amount, thereby converting the first shift amount and the second shift amount into 3-dimensional coordinate shift amounts in the virtual 3-dimensional space to provide initial values, and thereafter, repeatedly calculating 3-dimensional coordinate shift amounts from the initial values.

2. The non-transitory computer-readable storage medium having stored thereon the input processing program according to claim 1, wherein
the computer is further operable to execute an input status determination step for determining an input status from the pointing device, and
in the 2-dimensional coordinate shift amount calculation step, based on the calculation start condition that calculation starts when a status where an input from the pointing device is continuously being conducted is changed to a status where there is no input is determined in the input status determination step, the first shift amount and the second shift amount, per unit of time, of the 2-dimensional coordinates detected immediately before the status of no input in the 2-dimensional coordinate detection step are calculated.

3. The non-transitory computer-readable storage medium having stored thereon the input processing program according to claim 2, wherein
in the display control step, a predetermined virtual projection plane is set in the virtual 3-dimensional space and when in the input status determination step, an input from the pointing device is determined as being continuously conducted, a predetermined object is displayed at a position where the 2-dimensional coordinates detected in the 2-dimesional coordinate detection step are projected on the virtual projection plane, and
when the conversion of the first and second shift amounts into the 3-dimensional coordinate shift amounts has been conducted in the 3-dimensional coordinate shift amount conversion step, the object is lifted off the virtual projection plane, moved in the virtual 3-dimensional space, based on the 3-dimensional coordinate shift amounts, and displayed therein.

4. The non-transitory computer-readable storage medium having stored thereon the input processing program according to claim 3, wherein
in the display control step, when in the input status determination step, an input from the pointing device is determined as being continuously conducted, a display angle of the object to be projected on the virtual projection plane is controlled based on the 2-dimensional coordinates detected in the 2-dimensional coordinate detection step.

5. The non-transitory computer-readable storage medium having stored thereon the input processing program according to claim 3, wherein
the computer is further operable to execute a motion trajectory calculation step for calculating a motion trajectory, per unit of time, in the virtual 3-dimensional space by setting the 3-dimensional coordinate shift amounts obtained in the 3-dimensional coordinate shift amount conversion step, as an initial motion vector of the object in the virtual 3-dimensional space, and
in the display control step, based on the motion trajectory calculated in the motion trajectory calculation step, the object is lifted off the virtual projection plane, moved in the virtual 3-dimensional space, and displayed therein.

6. The non-transitory computer-readable storage medium having stored thereon the input processing program according to claim 5, wherein
in the display control step, when in the input status determination step, an input from the pointing device is determined as being continuously conducted, a display angle of the object to be projected on the virtual projection plane is controlled based on the 2-dimensional coordinates detected in the 2-dimensional coordinate detection step, and
in the motion trajectory calculation step, an initial normal vector of the object is set according to the display angle, and a motion trajectory, per unit of time, in the virtual 3-dimensional space is calculated based on the motion vector and the normal vector.

7. The non-transitory computer-readable storage medium having stored thereon the input processing program according to claim 1, wherein
in the 3-dimensional coordinate shift amount conversion step, based on the first shift amount and the second shift amount of the 2-dimensional coordinates, which are calculated in the 2-dimensional coordinate shift amount calculation step, a shift amount of a third axis perpendicular to the first and second axes of the 2-dimensional coordinates is calculated, and thereby the first shift amount and the second shift amount are converted into the 3-dimensional coordinate shift amounts.

8. The non-transitory computer-readable storage medium having stored thereon the input processing program according to claim 7, wherein in the 3-dimensional coordinate shift amount conversion step, when the first shift amount and the second shift amount calculated in the 2-dimensional coordinate shift amount calculation step are vx and vy, respectively, and predetermined constants are a, b, c, d, e, and f, a shift amount Vx of the first axis, a shift amount Vy of the second axis, and a shift amount Vz of the third axis, which are represented as the 3-dimensional coordinate shift amounts, are calculated using the following equation:

$$\begin{pmatrix} Vx \\ Vy \\ Vz \end{pmatrix} = \begin{pmatrix} ab \\ cd \\ ef \end{pmatrix} \begin{pmatrix} vx \\ vy \end{pmatrix}.$$

9. The non-transitory computer-readable storage medium having stored thereon the input processing program according to claim 8, wherein the constants a, b, c, d, e, and f respectively vary according to each kind of the objects.

10. An input processing device comprising:
a display screen;
a pointing device for inputting corresponding 2-dimensional coordinates on the display screen;
a display controller for displaying a virtual 3-dimensional space on the display screen;
a 2-dimensional coordinate detector for detecting the 2-dimensional coordinates inputted from the pointing device;
a 2-dimensional coordinate detector for calculating a first shift amount, per unit of time, in a first axis direction, of the 2-dimensional coordinates detected by the 2-dimensional coordinate detector, and a second shift amount of the 2-dimensional coordinates, per unit of time, in a second axis direction; and
a 3-dimensional coordinate shift amount converter for calculating a shift amount of a first axis in 3-dimensional coordinates in the virtual 3-dimensional space by using at least one of the first shift amount and the second shift amount, calculating a shift amount of a second axis in the 3-dimensional coordinates by using at least one of the first shift amount and the second shift amount, and calculating a shift amount of a third axis in the 3-dimensional coordinates by using at least one of the first shift amount and the second shift amount, thereby converting the first shift amount and the second shift amount into 3-dimensional coordinate shift amounts in the virtual 3-dimensional space to provide initial values, and thereafter, repeatedly calculating 3-dimensional coordinate shift amounts from the initial values.

11. The input processing device according to claim 10, wherein the pointing device is a touch panel covering the display screen.

12. An information processing system comprising:
a display screen;
a pointing device configured to generate input data representative of positions of the pointing device and timing of the positions;
a controller system configured to communicate with the display screen and the pointing device, the controller system including a non-transient memory storing instructions which cause the controller system to:
receive the input data from the pointing device display;
determine two-dimensional coordinates from the input data;
generate images of a virtual three-dimensional space to be presented on the display screen, wherein positions in the virtual three-dimensional space are determined based on a first axis, a second axis and a third axis, and each of the axes are orthogonal;
calculate a first shift amount along a first direction using the input data and corresponding to a shift in the positions of the pointing device along the first direction and during a unit of time;
calculate a second shift amount along a second direction using the input data and corresponding to a shift in the positions of the pointing device along the a second direction during the unit of time, wherein the second direction is different than the first direction;
calculate a three-dimensional shift amount including shift values corresponding to each of the first, second and third axes using as variable inputs to the calculation consist solely of the first and second shift amounts, and
shift a virtual objection in the virtual three-space based on the three-dimensional shift amount.

13. The information processing system of claim 12 wherein the instructions further cause the controller system to:
successively calculate the first and second shift amounts, and calculate the three-dimensional shift amount based on each successive calculations of the first and second shift amounts.

* * * * *

UNITED STATES PATENT AND TRADEMARK OFFICE
CERTIFICATE OF CORRECTION

PATENT NO. : 8,907,896 B2
APPLICATION NO. : 13/962551
DATED : December 9, 2014
INVENTOR(S) : Hideki Konno et al.

Page 1 of 1

It is certified that error appears in the above-identified patent and that said Letters Patent is hereby corrected as shown below:

On the Title Page, insert Item --(73) Assignee: Nintendo Co. Ltd., Kyoto (JP)--

Signed and Sealed this
Thirty-first Day of March, 2015

Michelle K. Lee
*Director of the United States Patent and Trademark Office*